United States Patent
Dufrene et al.

(10) Patent No.: US 10,666,370 B2
(45) Date of Patent: May 26, 2020

(54) MULTIPLE MODULATED SPUR CANCELLATION APPARATUS

(71) Applicant: Apple Inc., Cupertino, CA (US)

(72) Inventors: Krysztof Dufrene, Plesching (AT); Ram S. Kanumalli, St. pölten (AT); Silvester Sadjina, Linz (AT); Andreas Gebhard, Linz (AT)

(73) Assignee: Apple Inc., Cupertino, CA (US)

( * ) Notice: Subject to any disclaimer, the term of this patent is extended or adjusted under 35 U.S.C. 154(b) by 359 days.

(21) Appl. No.: 15/179,211

(22) Filed: Jun. 10, 2016

(65) Prior Publication Data

US 2017/0359136 A1    Dec. 14, 2017

(51) Int. Cl.
*H04J 1/12* (2006.01)
*H04B 1/10* (2006.01)
*H04L 5/00* (2006.01)

(52) U.S. Cl.
CPC .............. *H04J 1/12* (2013.01); *H04B 1/10* (2013.01); *H04L 5/0051* (2013.01)

(58) Field of Classification Search
CPC ...... H04J 1/12; H04L 5/0051; H04L 25/0204; H04L 25/0328; H04L 27/265;
(Continued)

(56) References Cited

U.S. PATENT DOCUMENTS 8,306,157 B2 * 11/2012 Seendripu ............ H03D 3/008
375/332
8,755,756 B1 * 6/2014 Zhang .................. H04B 1/109
455/114.2

(Continued)

FOREIGN PATENT DOCUMENTS

CN    107493157         12/2017
EP    2806566 A1        11/2014
WO    WO-2015108962 A1   7/2015

OTHER PUBLICATIONS

"European Application Serial No. 17169720.4, Extended European Search Report dated Oct. 24, 2017", 8 pgs.
(Continued)

*Primary Examiner* — Will W Lin
(74) *Attorney, Agent, or Firm* — Kowert, Hood, Munyon, Rankin & Goetzel, P.C.

(57) ABSTRACT

An apparatus of a wireless device can include baseband processing circuitry configured to generate a digitized downconverted signal based on a received radio frequency (RF) signal. The apparatus can also include estimation circuitry configured to detect a blocker signal in the downconverted signal, the blocker signal having power that exceeds a pre-determined threshold, and map the detected blocker signal to a plurality of harmonic frequencies associated with two or more carrier frequencies. The apparatus can include reference signal generation circuitry configured to generate a reference signal based on the plurality of harmonic frequencies and the received RF signal. The apparatus can include cancellation circuitry configured to apply a pre-processed reference signal (based on the reference signal) to the digitized downconverted signal to remove distortion associated with the detected blocker signal. The digitized downconverted signal is a baseband signal or an intermediate frequency (IF) signal.

22 Claims, 9 Drawing Sheets

(58) Field of Classification Search
CPC ......... H04L 5/1461; H04L 25/08; H04B 1/10; H04B 1/0475; H04B 1/40; H04B 1/525; H04B 1/12; H04B 1/1027; H04B 1/109; H04B 1/123
See application file for complete search history.

(56) References Cited

U.S. PATENT DOCUMENTS

| | | | | |
|---|---|---|---|---|
| 9,859,992 | B1* | 1/2018 | Hogerheiden | H04B 1/525 |
| 2005/0212604 | A1* | 9/2005 | Cyr | H01L 24/48 |
| | | | | 331/16 |
| 2006/0079191 | A1* | 4/2006 | Parssinen | H03G 3/3068 |
| | | | | 455/226.1 |
| 2009/0008807 | A1 | 1/2009 | Schneider | |
| 2009/0086864 | A1* | 4/2009 | Komninakis | H04B 1/10 |
| | | | | 375/346 |
| 2010/0210230 | A1* | 8/2010 | Havener | H04B 1/0032 |
| | | | | 455/210 |
| 2012/0183031 | A1* | 7/2012 | Kolze | H04B 1/10 |
| | | | | 375/224 |
| 2014/0120857 | A1* | 5/2014 | Da Silva | H04B 1/10 |
| | | | | 455/307 |
| 2015/0146765 | A1* | 5/2015 | Moffatt | H04B 1/62 |
| | | | | 375/219 |
| 2015/0180685 | A1* | 6/2015 | Noest | H04B 1/0475 |
| | | | | 375/219 |
| 2015/0188646 | A1* | 7/2015 | Bharadia | H04L 5/1438 |
| | | | | 370/278 |
| 2015/0270865 | A1* | 9/2015 | Polydoros | H04B 1/62 |
| | | | | 375/346 |
| 2015/0288399 | A1* | 10/2015 | Pratt | H04L 23/00 |
| | | | | 455/296 |
| 2016/0112226 | A1* | 4/2016 | Martinez | H04L 27/2003 |
| | | | | 455/110 |
| 2016/0128136 | A1* | 5/2016 | Anandakumar | H04L 27/0014 |
| | | | | 375/219 |
| 2016/0182108 | A1* | 6/2016 | Takahashi | H04B 1/16 |
| | | | | 455/214 |
| 2016/0211882 | A1* | 7/2016 | Hwang | H04B 1/126 |
| 2016/0294425 | A1* | 10/2016 | Hwang | H04B 1/525 |
| 2017/0005773 | A1* | 1/2017 | Liu | H04B 1/525 |
| 2017/0111155 | A1* | 4/2017 | Liu | H04B 1/10 |
| 2017/0180160 | A1* | 6/2017 | Moorti | H04L 25/03006 |

OTHER PUBLICATIONS

Ayazian, S., et al., "Feedforward Interference Cancellation in Radio Receiver Front-Ends", IEEE Transactions on Circuits and Systems II: Express Briefs, 54(10), (2007), 902-906.

Gebhard, Andreas, et al., "Adaptive self-interference cancelation in LTE-A carrier aggregation FDD direct-conversion transceivers", 2016 Ieee Sensor Array and Multichannel Signal Processing Workshop (SAM), IEEE,, (Jul. 10, 2016), 5 pgs.

Schlechter, Thomas, et al., "Advanced Filter Bank Based Approach for Blocker Detection in LTE Systems", Proc. IEEE Int. Symp. Circuits and Syst. (ISCAS 2011) pp. 2189-2192, (2011), 5 pgs.

* cited by examiner

MULTIPLE MODULATED SPUR CANCELLATION APPARATUS

TECHNICAL FIELD

Embodiments pertain to wireless communications. Some embodiments relate to wireless networks including 3GPP (Third Generation Partnership Project) networks, 3GPP LTE (Long Term Evolution) networks, 3GPP LTE-A (LTE Advanced) networks, and 5G networks, although the scope of the embodiments is not limited in this respect. Some embodiments relate to wireless devices and methods configured for multiple modulated spur cancellation.

BACKGROUND

With the increase in different types of devices communicating with various network devices, usage of 3GPP LTE networks has increased. Over the last several years, cellular communication have developed from low-data-rate voice and text-messaging applications to high-data-rate applications, such as high definition (HD) audio and video streaming, full-featured Internet connectivity, with myriad useful applications, all of which have made a significant impact on the public's daily lives. Fifth generation (5G) wireless networks are forthcoming, and are expected to enable even greater speed, connectivity, and usability.

One area of development for LTE Advanced and 5G systems is carrier aggregation (CA) and improving interference detection and cancellation. Major challenges in the design of wireless receiver systems is ensuring their ability to reliably detect wanted signals despite the presence of interfering signals. More specifically, in CA scenarios, spectra of local oscillator (LO) signals contain interferers (or spurs) caused by crosstalk between the LO synthesizers and/or the LO distribution paths. More specifically, electrical and electromagnetic coupling exists between receiver LOs due to shared RF path, shared power supply and adjacent LO traces. As a result, multiple modulated spurs appear in the form of unwanted side tones in the spectrum of the LOs, each side tone corresponding to an unwanted receive band which is down-mixed and overlaps with wanted receive channel. Therefore, a practical solution is needed for a multiple modulated spur cancellation.

BRIEF DESCRIPTION OF THE FIGURES

In the figures, which are not necessarily drawn to scale, like numerals may describe similar components in different views. Like numerals having different letter suffixes may represent different instances of similar components. Some embodiments are illustrated by way of example, and not limitation, in the following figures of the accompanying drawings.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The following description and the drawings sufficiently illustrate specific embodiments to enable those skilled in the art to practice them. A number of examples are described in the context of 3GPP communication systems and components thereof. It will be understood that principles of the embodiments are applicable in other types of communication systems, such as Wi-Fi or Wi-Max networks, Bluetooth or other personal-area networks, Zigbee or other home-area networks, wireless mesh networks, and the like, without limitation, unless expressly limited by a corresponding claim. Given the benefit of the present disclosure, persons skilled in the relevant technologies will be able to engineer suitable variations to implement principles of the embodiments in other types of communication systems. Various diverse embodiments may incorporate structural, logical, electrical, process, and other differences. Portions and features of some embodiments may be included in, or substituted for, those of other embodiments. Embodiments set forth in the claims encompass all presently-known, and after-arising, equivalents of those claims.

Figure 1:
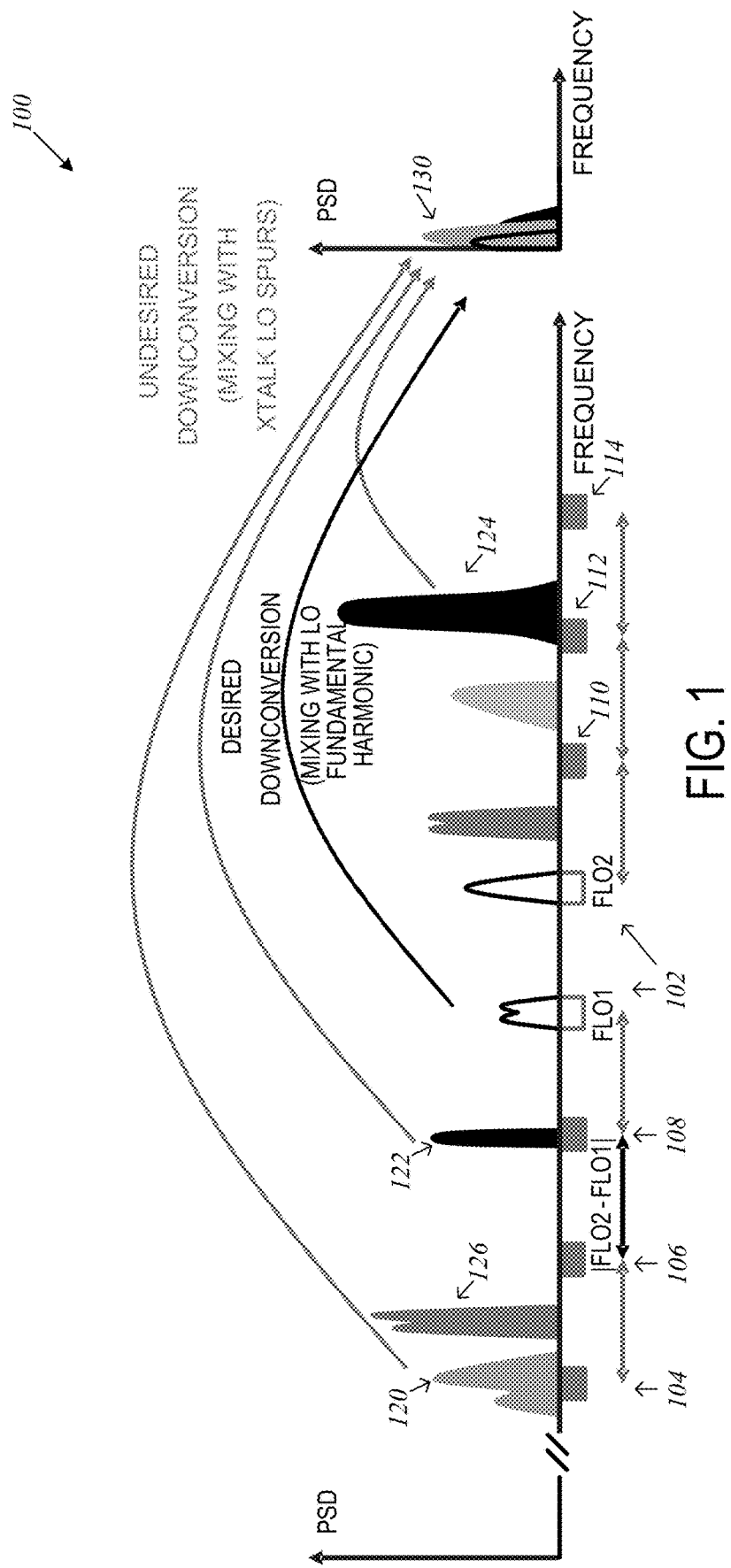
FIG. 1 is a diagram of multiple interferers in carrier aggregation (CA) scenarios in accordance with some embodiments.

FIG. 1 is a diagram of multiple interferers in carrier aggregation (CA) scenarios in accordance with some embodiments. In CA receivers, spectra of local oscillator (LO) signals (e.g., two LOs with frequencies flo1 and flo2) contain spurs at frequencies governed by building laws of type m*flo1+−n*flo2 (m and n being integers), caused by crosstalk between synthesizers and/or LO distribution paths. If a strong interfering signal (usually modulated) at any of such frequencies is picked up by a receive antenna or generated locally by a transmit section of a wireless transceiver, it gets downconverted to DC as a (modulated) spur (or blocker signal) and may significantly degrade signal-to-noise-and-distortion (SNDR) ratio of the wanted signal, increasing bit error rate or interrupting reliable reception.

Referring to FIG. 1, there is illustrated a power spectral density graph 100 associated with a multiple interferer scenario associated with, e.g., 2xCA LTE FDD system. More specifically, a receiver can be configured in 2CA mode to receive signals located at frequencies 102 (flo1 and flo2). Sub-bands corresponding to certain LO combinations (m*flo1+−n*flo2) are referenced as 104-114. Due to cross-talk effects, unwanted signals in the sub-bands 104-114 (which sub-bands are marked with grey rectangles in FIG. 1) may get downconverted to DC, with different conversion gains and phases, depending on cross-talk strength. In the example illustrated in FIG. 1, the interferer/blocker signals 120, 122, and 124 lie in the sub-bands 104, 108, and 112 respectively. Other interferers (e.g., 126), apart from being downconverted to IF via normal mixing with a fundamental LO harmonic, are not harmful for the desired signal as they not lie directly in the sub-bands.

In some examples, modulated spurs can be significantly decreased (or removed) by changing the mode of operation of the receiver from zero-IF to low-IF, or by using feedforward interference cancellation principles. However, switching the receiver operation to low-IF may not be effective in all interferer scenarios, and it cannot be used for desired signals with widest bandwidths using highest analog-to-digital conversion (ADC) sampling rates. The feedforward spur cancellation principles are addressed in reference to FIG. 2 below.

Figure 2:
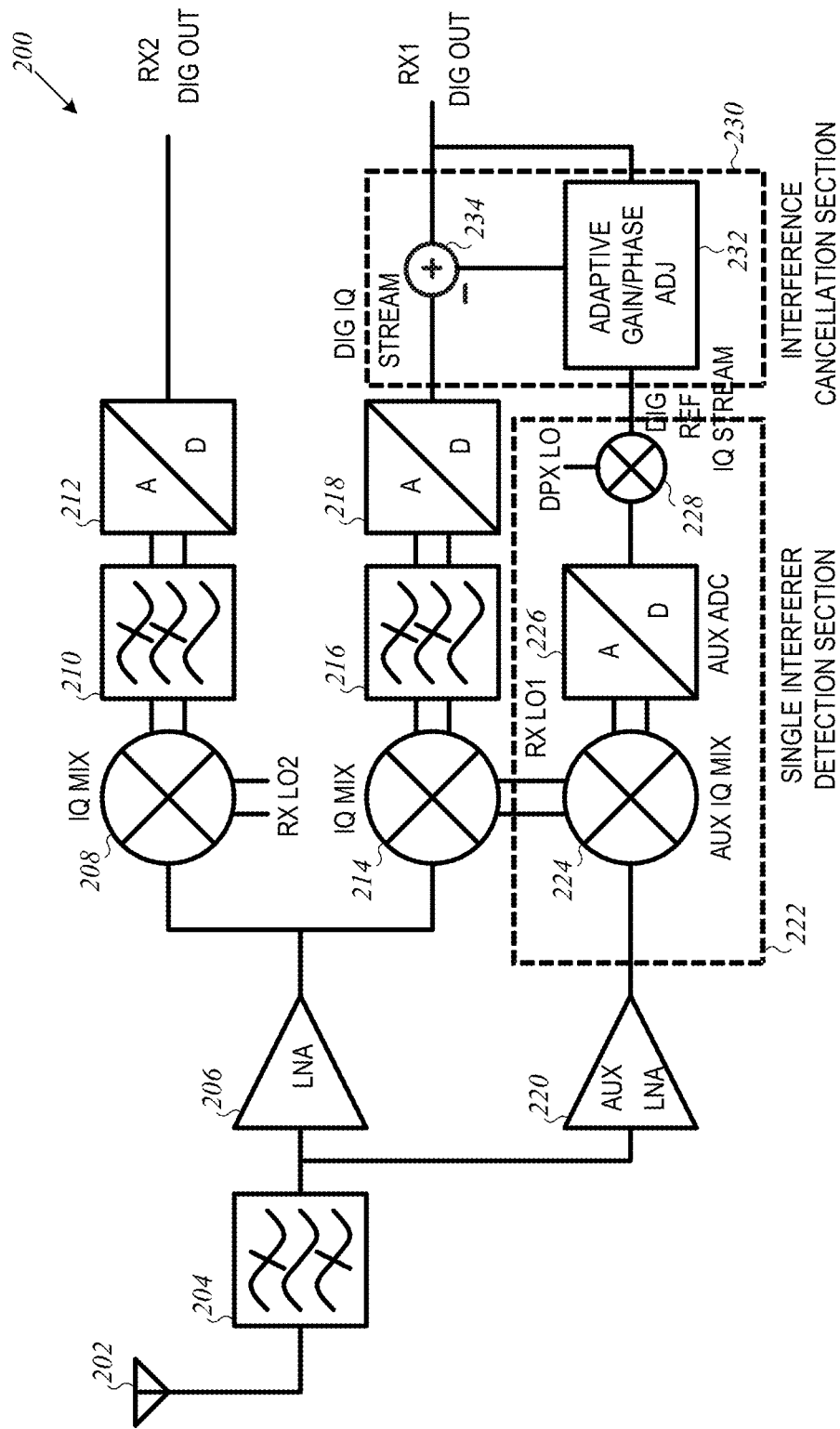
FIG. 2 is a block diagram of a single modulated interferer cancellation system in accordance with some embodiments.

FIG. 2 is a block diagram of a single modulated interferer cancellation system in accordance with some embodiments. Referring to FIG. 2, the interferer cancellation system 200 can include two receiver chains that generate two digitized signal outputs (e.g., RX1 DIG OUT and RX2 DIG OUT). The two receiver chains can be used in, e.g., 2xCA LTE FDD system operating with carrier aggregation in intra-band mode. The RF signals can be received via antenna 202, band-pass filtered by filter 204, and amplified by low noise amplifier (LNA) 206. The second receive (Rx) processing chain can include a downconversion mixer 208 using carrier frequency LO2. The downconverted signal can be filtered by filter 210 and digitized by analog-to-digital converter (ADC) 212. The first Rx processing chain can downconvert the signal amplified by LNA 206 via a downconversion mixer 214 using carrier frequency LO1. The downconverted signal can be filtered by filter 216 and digitized by ADC 218.

In an example, the first receiver chain can include a single interferer detection section 222 and an interference cancellation section 230. The detection section 222 can receive an RF signal that has been filtered by filter 204 and amplified by auxiliary amplifier 220. The amplified signal can be downconverted by the auxiliary mixer 224, using the same carrier frequency (LO1) as mixer 214. The downconverted signal is digitized by the ADC 226.

The detection section 222 can be used in instances of single modulated interferers at an a priori known carrier frequency (e.g., DPX LO). In some instances, the known carrier frequency of an interferer can be associated with the transmit (Tx) band frequency of the Tx section of the example LTE FDD system. The mixer 228 mixes the digitized signal with the known carrier frequency (DPX LO) to generate a reference signal (DIG REF IQ STREAM), which is communicated as input to the interference cancellation section 230.

The cancellation section includes an adaptive gain/phase adjustment block 232 and a subtraction element 234. The adjustment block can receive the digitized output signal (RX1 DIG OUT) as feedback, and can generate an adjustment signal (e.g., for gain and/or phase adjustment) based on the reference signal from the detection section 222. The adjustment signal can be mixed with the digitized stream output of ADC 218 in order to cancel (or substantially decrease) the a priori known interferer signal at carrier frequency DPX LO.

Even though the cancellation system 200 of FIG. 2 can be effective in removing modulated spurs, only a single modulated spur can be eliminated and the carrier frequency of the spur has to be known a priori. Additionally, the auxiliary ADC 226 is a wideband ADC, which can be associated with more signal noise and power consumption.

Figure 3:
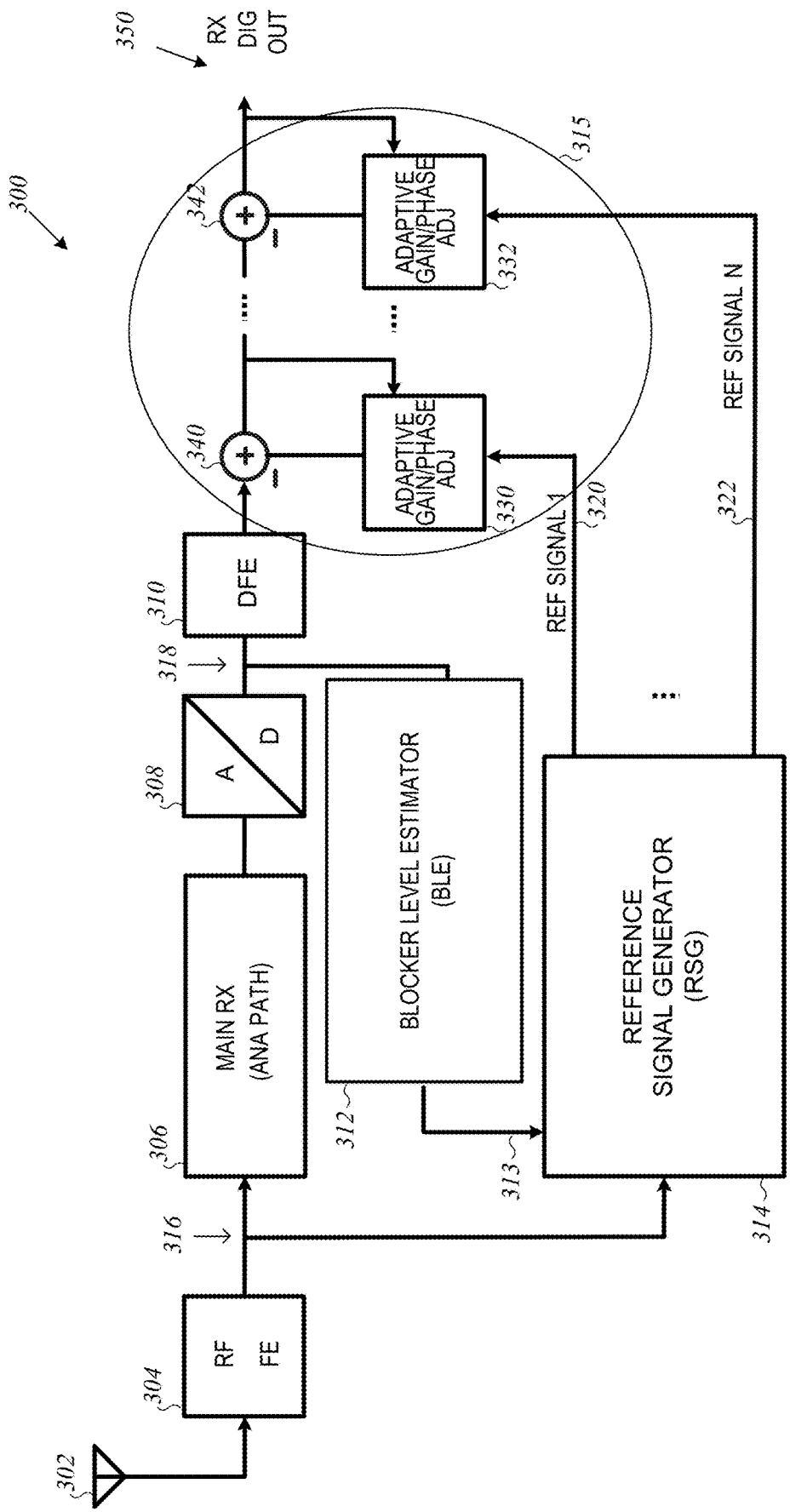
FIG. 3 is a block diagram of a system architecture for multiple modulated spur cancellation in accordance with some embodiments.

FIG. 3 is a block diagram of a system architecture for multiple modulated spur cancellation in accordance with some embodiments. Referring to FIG. 3, the system architecture 300 can be used for independent cancellation of multiple interferers downconverted on top of a desired channel due to spurs generated by, e.g., local oscillator crosstalk. The system 300 can include a blocker level estimator (BLE) 312, a reference signal generator 314, and a multi-signal cancellation block 315 (including, e.g., the adaptive adjustment blocks 330-332 in combination with subtraction elements 340-342). The reference signal generator (RSG) 314 enables (depending on in-band interferer activity) single or multiple reference signal generation paths in the RSG 314 as well as the multi-signal cancellation block 315.

In operation, an RF signal is received via the antenna 302 and is initially processed by the RF front end (FE) 304 to generate signal 316. The RF FE 304 can include various filtering and signal amplification circuits. In instances when the system architecture 300 operates in a carrier aggregation LTE FDD environment, the input signal (e.g., 316) may additionally contain own transmit (Tx) self-interference leaking to the receive (Rx) path of architecture 300, due to RF front-end non-idealities.

The input signal 316, including interferers, is downconverted to baseband by the main analog Rx processing block 306, sampled and quantized by an analog-to-digital converter (ADC) 308, and sent to a digital front-end (DFE) section 310 for further filtering and other signal processing. The downconverted signal at the output of the main analog processing block 306 can be a baseband signal or an intermediate frequency (IF) signal. The ADC 308 can be an oversampled delta-sigma modulation (DSM) based converter that passes through and converts a wideband BB/IF signal (i.e., signal output from block 306).

The blocker level estimator (BLE) 312 may comprise suitable circuitry, logic, and/or code and may be used to analyze the signal spectrum of the digitized downconverted signal 318 to determine the presence of one or more blocker signals with signal power above a threshold level, or the presence of quantization noise level also above the threshold level.

Figure 4:
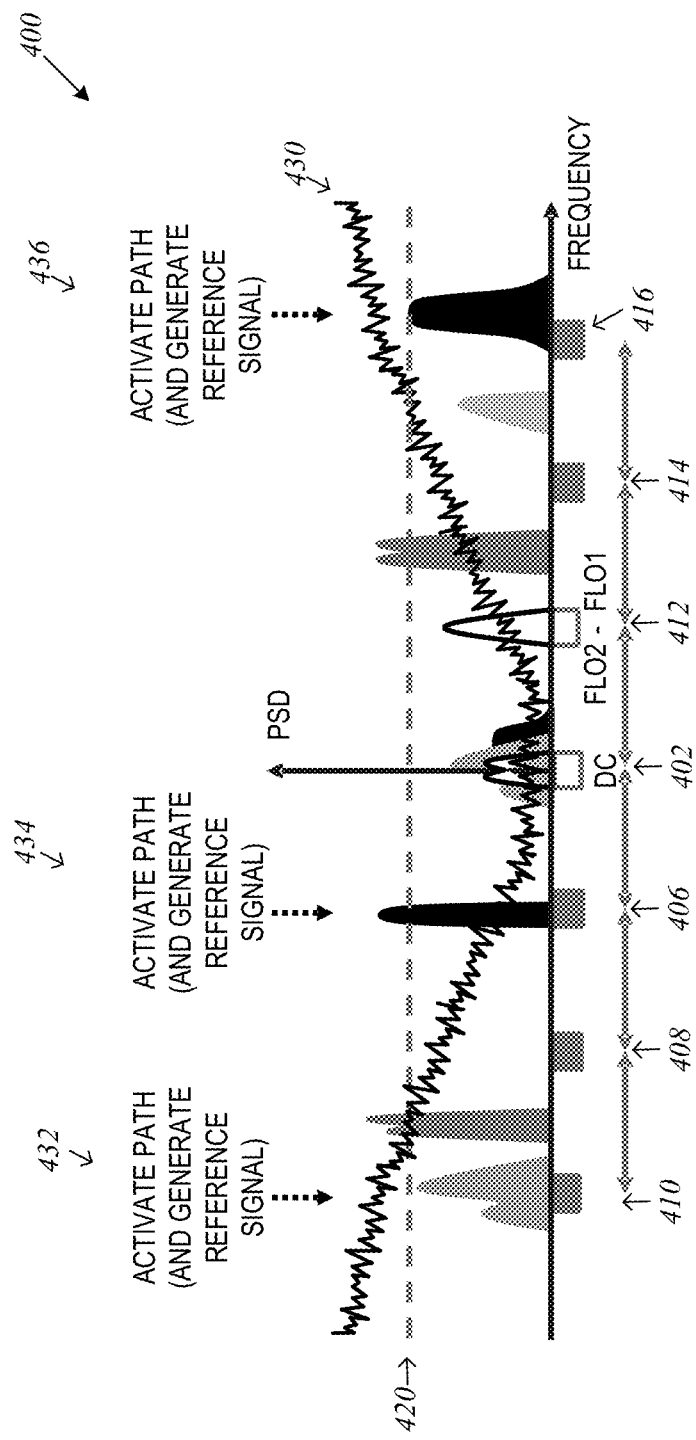
FIG. 4 is a diagram illustrating an example double-sided spectrum in a receive channel, which can be used for spur cancellation in accordance with some embodiments.

FIG. 4 is a diagram illustrating an example double-sided spectrum in a receive channel, which can be used for spur cancellation in accordance with some embodiments. Referring to FIG. 4, the spectrum 400 can be a double-sided (I+j*Q) IF spectrum of the digitized downconverted signal 318, where the architecture 300 uses carrier aggregation with two LO carrier frequencies, FLO1 and FLO2. Sub-bands corresponding to a certain LO combination (m*flo1+−n*flo2) are referenced as 402-416. The dashed line 420 denotes a signal power threshold level, above which a corresponding reference signal generation path can be activated so that a reference signal can be generated for canceling (or otherwise substantially reducing) the interferer/blocker signal.

Line 430 denotes the quantization noise level within the downconverted digitized signal 318. As seen in FIG. 4, the blocker signals in the sub-bands 410 and 416 are below the threshold level 420; however, the quantization noise level at those sub-bands is above the threshold 420. Consequently, reference signal generation paths are activated (432 and 436) so that the reference signal generator (RSG) 314 can generate corresponding reference signal for canceling the distortions associated with the blocker signals. As evident from FIG. 4, at high IF offset frequencies, corresponding reference generation paths are effectively always activated (irrespective of interferer presence), due to high quantization noise level as well as due to attenuation caused by signal transfer function (STF) response of the ADC 308.

At the sub-band 406, even though the quantization noise level is below the threshold 420, the blocker signal level is above the threshold 420. Consequently, the reference signal generation path is also activated (at 434) for the blocker signal at sub-band 406.

Figure 6:
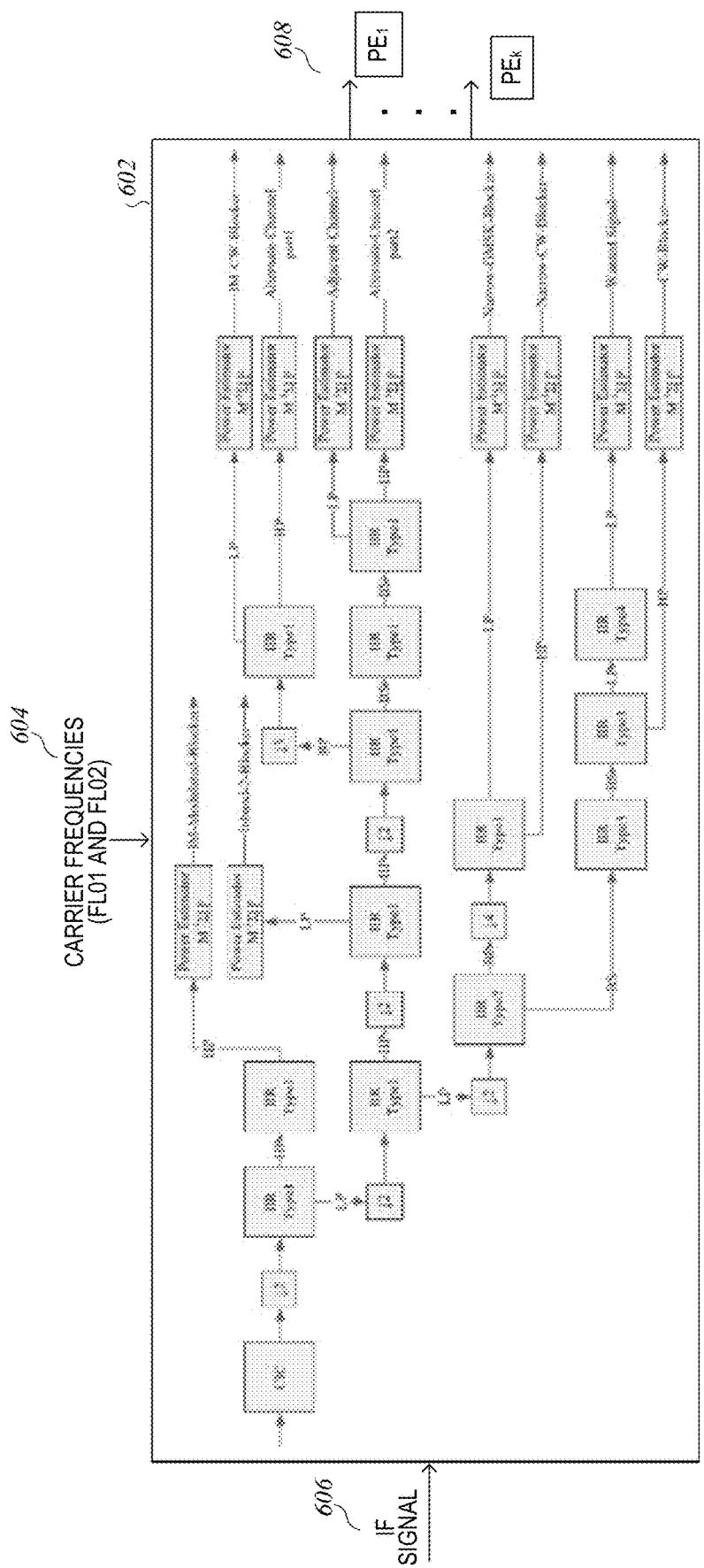
FIG. 6 is a block diagram of an example power extraction filter chain in accordance with some embodiments.

Even though the quantization noise power level (e.g., 430) rises with IF frequency, the BLE 312 can detect blockers in the spectrum of the digitized signal using, e.g., a wideband blocker detector such as illustrated in FIG. 6.

Figure 5:
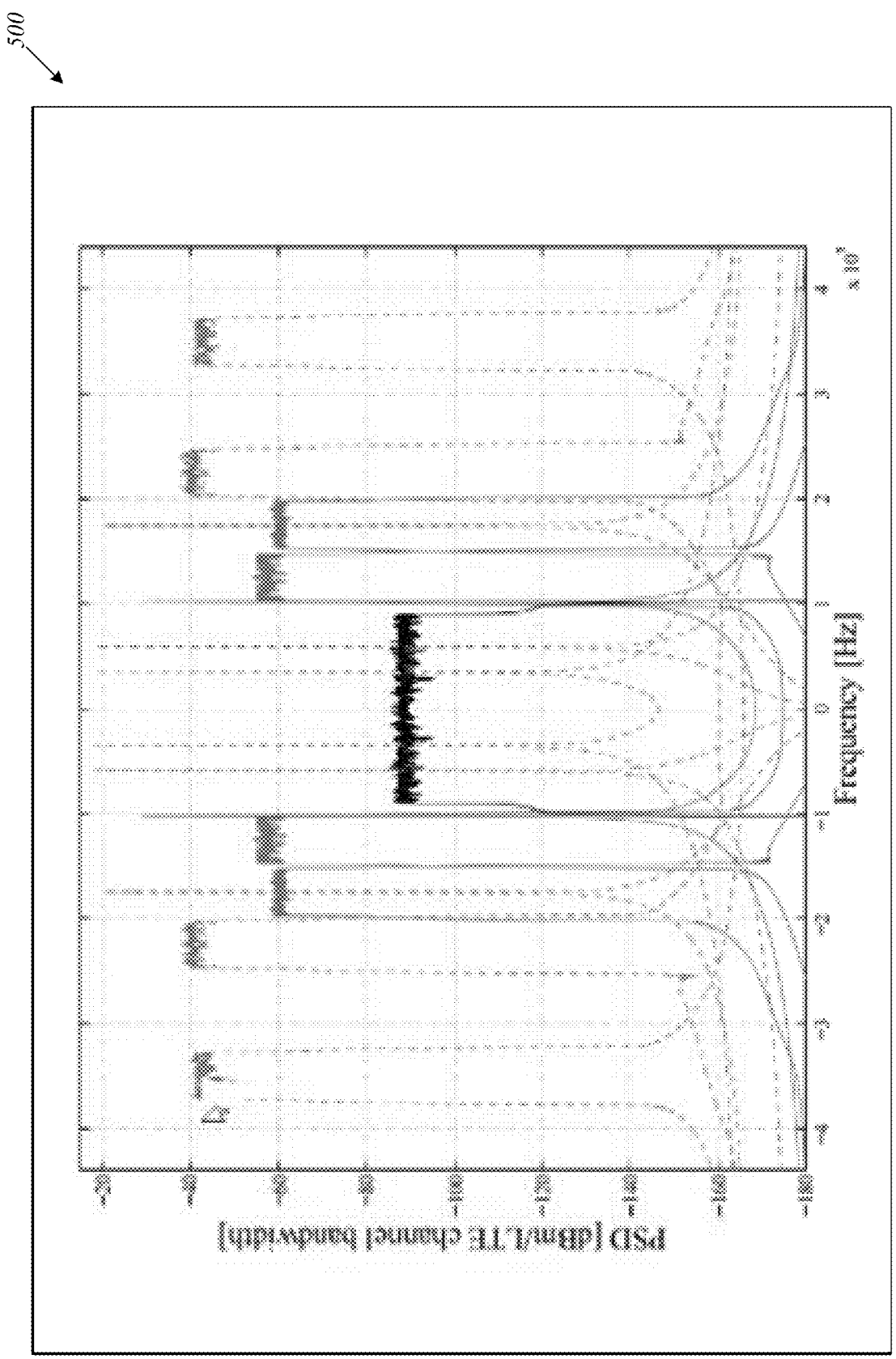
FIG. 5 is a diagram illustrating power spectral density (PSD) graph for an LTE20 blocker environment in accordance with some embodiments.

FIG. 5 is a diagram illustrating power spectral density (PSD) graph for an LTE20 blocker environment in accordance with some embodiments. The graph 500 represents a blocker scenario for an LTE signal in the 20 MHz channel bandwidth. It can be noted from FIG. 5 that the wanted LTE signal (in black) is embedded within several blocker signals (in gray). A power extraction filter chain (e.g., as illustrated in FIG. 6) can be used to determine signal power of blocker signals at one or more harmonic frequency combinations associated with multiple carrier frequencies.

FIG. 6 is a block diagram of an example power extraction filter chain in accordance with some embodiments. Referring to FIG. 6, the power extraction filter 602 can be implemented as part of the blocker level estimator 312, and can be used to detect blocker signals and estimate the signal power level of such blocker signals. In an example, the filter 602 can include a series of high and low-pass filter combinations. In an example, the filter 602 can be based on the principle of discrete wavelet transforms and can include multiple filter sub-chains (e.g., eight sub-chains are seen in FIG. 6). Each of the filter sub-chains is associated with a specific spectrum slice, and it can be used to extract the blocker spectrum portion and to estimate the power within that spectrum slice. The entire filter chain of filter 602 can be realized with multiplier-free high-pass filters, low-pass filters, and down-sampling blocks.

In an example, the carrier frequencies 604 (e.g., FLO1 and FLO2) are known for a given LTE carrier aggregation scenario. Therefore, as the harmonic combinations and their corresponding carrier frequencies, and (consequently) the frequency ranges of the potential blockers, are pre-known for a given configuration, the power extraction filter 602 can be configured so that only the corresponding sub-chain (or sub-chains) is activated. In this regard, as signal 606 is received (e.g., the downconverted digitized signal 318), the filter 602 in the BLE 312 estimates the signal power for the signal located at the corresponding harmonic combination associated with the sub-chain (or sub-chains). The estimated powers (e.g., $PE_1$-$PE_k$ 608) at different frequency portions are then used by the BLE 312 to determine the LO harmonic combinations (m*flo1±n*flo2) such blockers are present at (or near), and enables appropriate reference signal generation paths in the RSG 314. For example, the BLE 312 can communicate the (m; n) combinations (e.g., 313) for the specific harmonic combination that use reference signal generation (e.g., there is a blocker at/near such frequency of harmonic combination with above-threshold power or the quantization noise is above the threshold level).

The reference signal generator (RSG) 314 may comprise suitable circuitry, logic and/or code and can be used to generate one or more reference signals 320, . . . , 322 based on the harmonic combination identification information 313 received from the BLE 312. More specifically, the RSG 314 can generate independent baseband reference signals 320, . . . , 322 corresponding to RF interferers situated at sensitive locations (e.g., at frequencies and their corresponding harmonic combination identified by the BLE 312). The RSG 314 can use various techniques for generating the reference signals, such as mixing with multiphase LO signals and subsequent recombination, compressed sampling, or mixing with auxiliary oscillators tuned to various sub-bands.

In some instances, directly using spectrum estimated output from the BLE 312 as reference for interference cancellation might be difficult because of insufficient SNR caused by quantization noise level at high IF offset frequencies. Therefore, as seen in FIG. 3, the RF signal 316 after the RF FE 304 is communicated as input to the RSG 314 so that analog-centric detection can be used when the reference signals are generated.

The reference signals 320, . . . , 322 can be communicated to the multi-signal cancellation block 315 so that the signals can be applied to the signal output from the DFE 310 in order to remove the distortion (e.g., modulated spurs). The cancellation block 315 can include adaptive gain/phase adjustment blocks 330, . . . , 332, and corresponding mixers 340, . . . , 342. Each of the adaptive gain/phase adjustment blocks 330 can use as a feedback signal the signal output 350 so as to estimate specific gain and/or phase adjustment for the reference signal for effective blocker signal cancellation.

Figure 7:
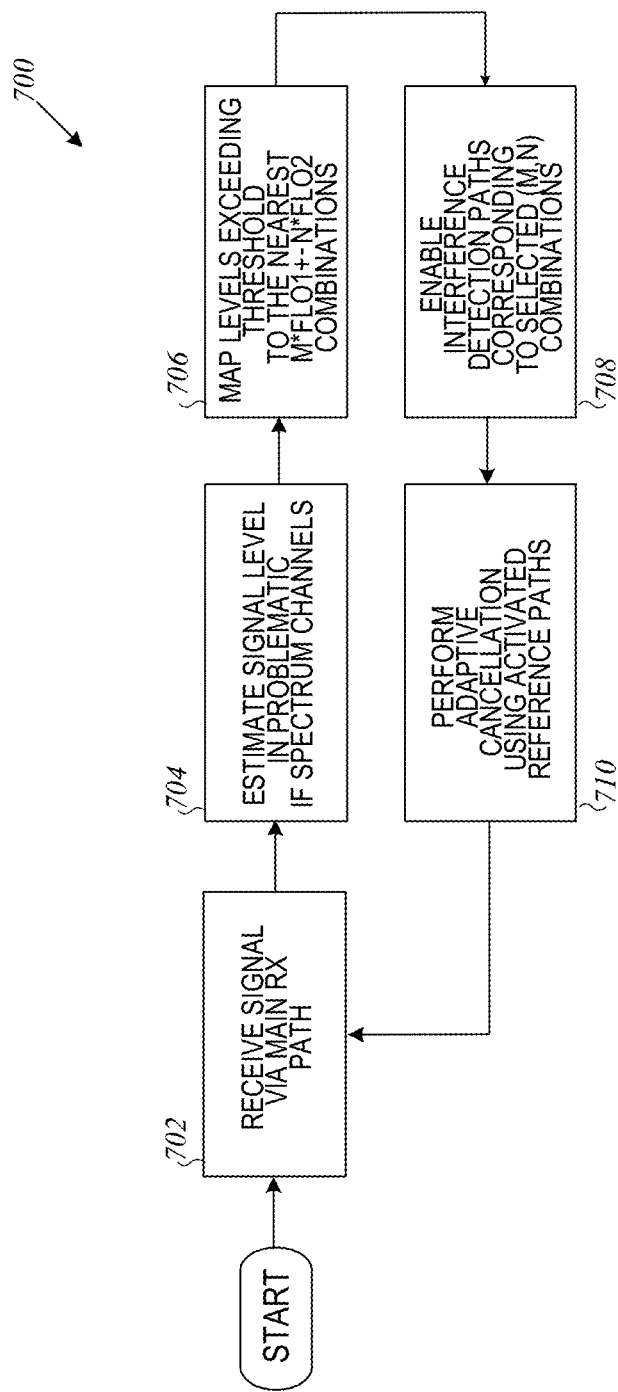
FIGS. 7-8 are flow diagrams illustrating example functionalities for spur cancellation in accordance with some embodiments.
Figure 8:
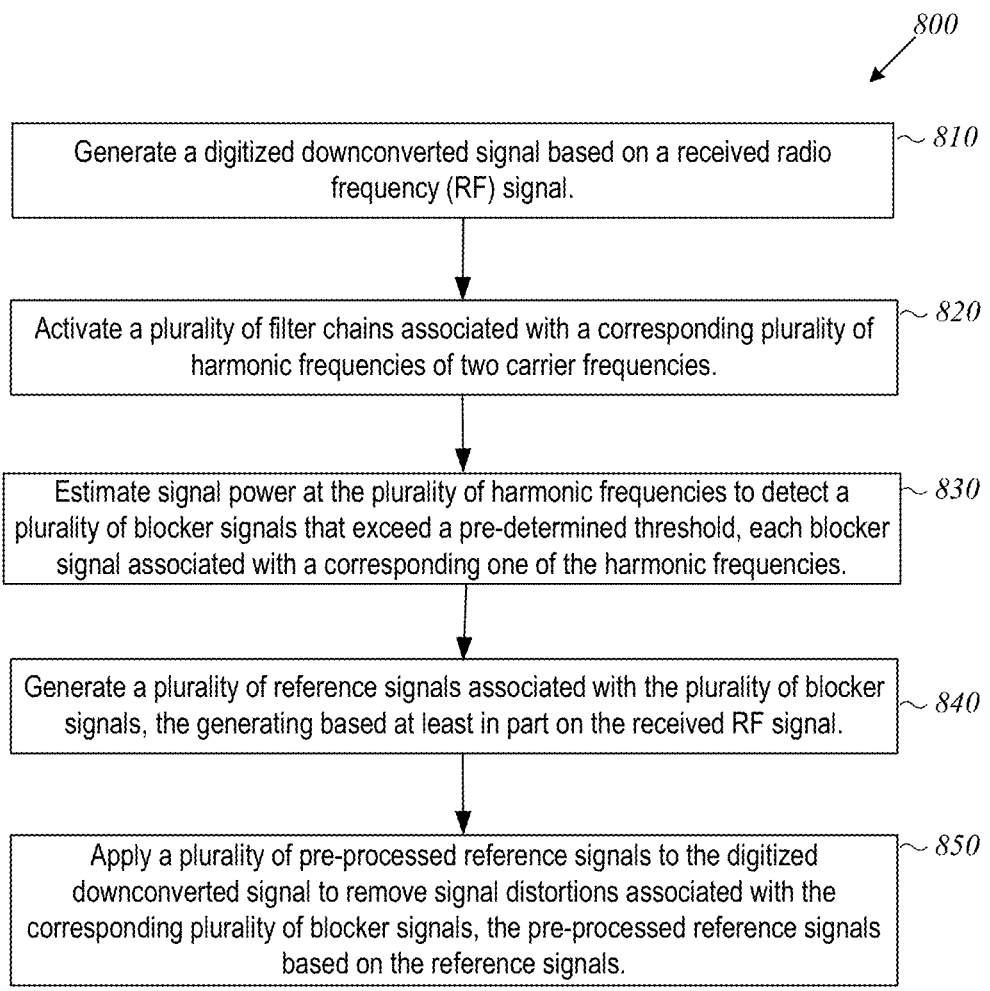

FIGS. 7-8 are flow diagrams illustrating example functionalities for spur cancellation in accordance with some embodiments. Referring to FIGS. 3 and 7, the example method 700 may start at 702, when a signal is received via a main Rx path. For example, the signal received via antenna 302 is downconverted and digitized by ADC 308, to generate signal 318. At 704, the BLE 312 can receive signal 318 and can estimate the signal level in one or more IF spectrum channels. For example, the BLE 312 can use filter 602 to estimate power levels at specific harmonic frequencies (that can be known in advance; e.g., carrier aggregation LO frequencies). At 706, the BLE 312 can determine which blocker signals have power above a threshold (or there is quantization noise above the threshold), and can map the signals that exceed such threshold to the nearest m*flo1±n*flo2 combinations (i.e., select values for m and n). At 708, interference detection paths can be enabled for the identified m*flo1±n*flo2 combinations. More specifically, the RSG 314 can generate the reference signals 320, . . . , 322 based on the information identifying the carrier frequency harmonics with blocker signals (or noise above the threshold level) received from the BLE 312. At 710, the multi-signal cancellation block 315 can perform adaptive cancellation based on the activated reference signal paths and the generated reference signals 320, . . . , 322.

Referring to FIGS. 3 and 8, the example method 800 may start at 810, when the ADC 308 generates a digitized downconverted signal (e.g., 318) based on a received radio frequency (RF) signal (e.g., 316). At 820, a plurality of filter chains associated with a corresponding plurality of harmonic frequencies of two carrier frequencies can be activated. For example, the BLE 312 can use the filter chain 602 to activate corresponding sub-chains to measure signal power at the known harmonic frequencies associated with the two carrier frequencies (e.g., FLO1 and FLO2). At 830, the BLE 312 can estimate signal power at the plurality of harmonic frequencies to detect a plurality of blocker signals that exceed a pre-determined threshold, each blocker signal associated with a corresponding one of the harmonic frequencies (e.g., detect the blockers or noise above threshold, as described in reference to FIG. 4). At 840, a plurality of reference signals (e.g., 320, . . . , 322) associated with the plurality of blocker signals can be generated (e.g., by the RSG 314). The generating can be based at least in part on the received RF signal (e.g., the RF signal 316 is used as input to the RSG 314). At 850, the multi-signal cancellation block 315 can apply a plurality of pre-processed reference signals associated with the reference signals to the digitized down-converted signal to remove signal distortions associated with the corresponding plurality of blocker signals. In an example, the pre-processed reference signals can be based on gain and/or phase adjustment of the generated reference signals.

Figure 9:
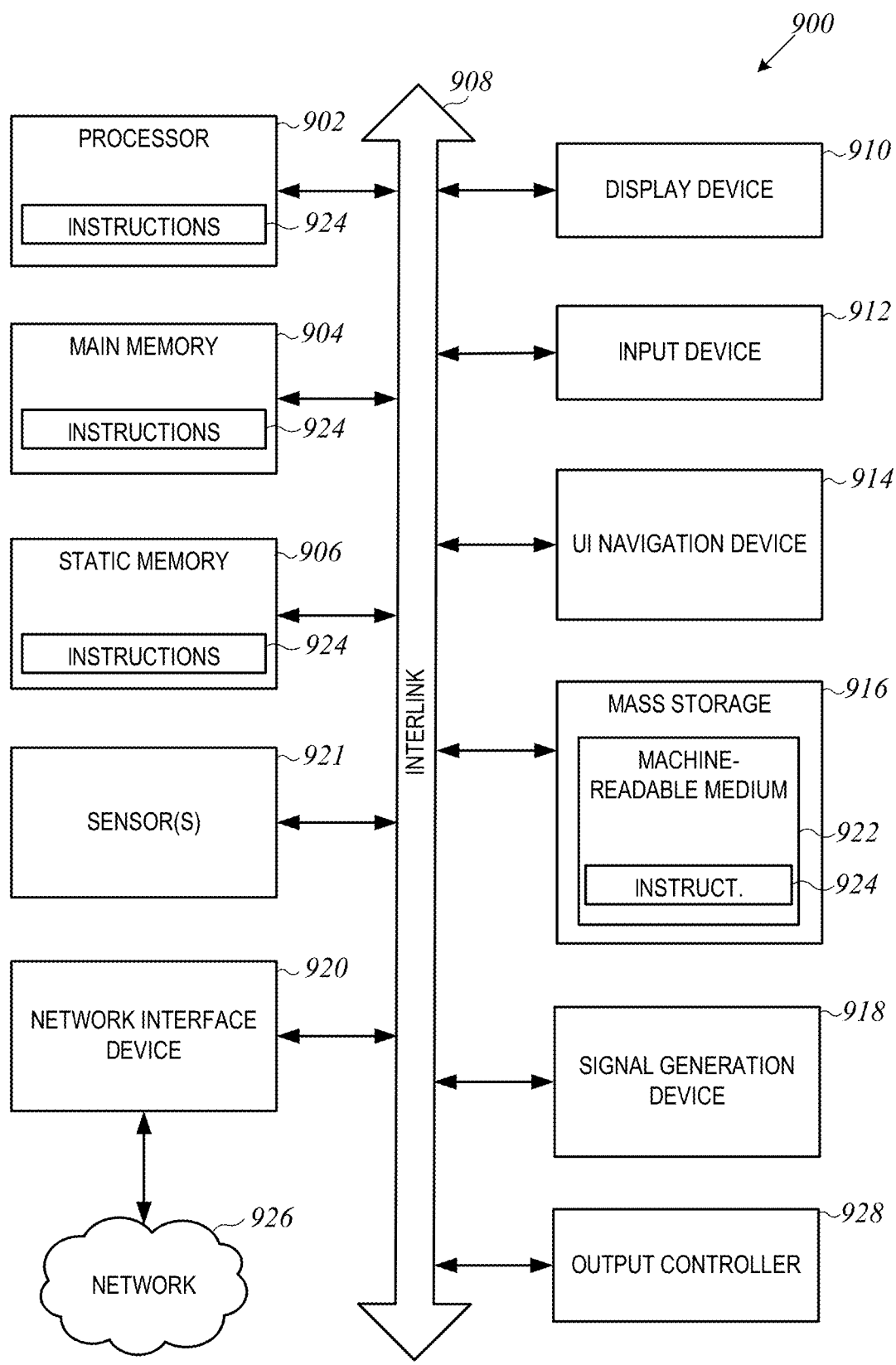
FIG. 9 illustrates a block diagram of a communication device such as an eNB or a UE, in accordance with some embodiments.

FIG. 9 illustrates a block diagram of a communication device such as an eNB or a UE, in accordance with some embodiments. In alternative embodiments, the communication device 900 may operate as a standalone device or may be connected (e.g., networked) to other communication devices. In a networked deployment, the communication device 900 may operate in the capacity of a server communication device, a client communication device, or both in server-client network environments. In an example, the communication device 900 may act as a peer communication device in peer-to-peer (P2P) (or other distributed) network environment. The communication device 900 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The communication device 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The communication device 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The communication device 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a communication device readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the communication device 900. In an example, one or any combination of the hardware processor 902, the main memory 904, the static memory 906, or the storage device 916 may constitute communication device readable media.

While the communication device readable medium 922 is illustrated as a single medium, the term "communication device readable medium" may include a single medium or multiple media (e.g., a centralized or distributed database, and/or associated caches and servers) configured to store the one or more instructions 924.

The term "communication device readable medium" may include any medium that is capable of storing, encoding, or carrying instructions for execution by the communication device 900 and that cause the communication device 900 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), MIMO, or multiple-input single-output (MISO) techniques. In some examples, the network interface device 920 may wirelessly communicate using Multiple User MIMO techniques. The term "transmission medium" shall be taken to include any intangible medium that is capable of storing, encoding or carrying instructions for execution by the communication device 900, and includes digital or analog communications signals or other intangible medium to facilitate communication of such software.

Additional notes and examples:

Example 1 is an apparatus of a wireless device, the apparatus comprising: front-end processing circuitry configured to generate a digitized downconverted signal based on a received radio frequency (RF) signal; estimation circuitry configured to: detect a blocker signal in the downconverted signal, the blocker signal having power that exceeds a pre-determined threshold; and map the detected blocker signal to a plurality of harmonic frequencies associated with two or more carrier frequencies; reference signal generation circuitry configured to generate a reference signal based on the plurality of harmonic frequencies and the received RF signal; and cancellation circuitry configured to apply a pre-processed reference signal to the digitized downconverted signal to remove distortion associated with the blocker signal, the pre-processed reference signal based on the reference signal. The pre-processed reference signals can be generated by gain and/or phase adjustment of the reference signals.

In Example 2, the subject matter of Example 1 optionally includes wherein the digitized downconverted signal is a baseband signal or an intermediate frequency (IF) signal.

In Example 3, the subject matter of any one or more of Examples 1-2 optionally include wherein the estimation circuitry comprises a plurality of filtering chains for a corresponding plurality of frequency sub-bands.

In Example 4, the subject matter of Example 3 optionally includes wherein the estimation circuitry is further configured to: engage only a portion of the plurality of filtering chains associated with the plurality of harmonic frequencies; and detect a power level of the blocker signal using the engaged portion of the plurality of filtering chains.

In Example 5, the subject matter of Example 4 optionally includes wherein the estimation circuitry is further configured to: detect that the blocker signal overlaps with one of the plurality of harmonic frequencies; and identify the one of the plurality of harmonic frequencies to the reference signal generation circuitry.

In Example 6, the subject matter of Example 5 optionally includes wherein the reference signal generation circuitry is further configured to: generate the reference signal based on the identified one of the plurality of harmonic frequencies.

In Example 7, the subject matter of any one or more of Examples 1-6 optionally include wherein the estimation circuitry is further configured to: select a harmonic frequency of the plurality of harmonic frequencies, wherein a noise level of the downconverted signal at the selected harmonic frequency exceeds a noise floor level. In an example, the noise level can be the signal power level, and the noise floor level can be a signal power threshold level.

In Example 8, the subject matter of Example 7 optionally includes wherein the reference signal generation circuitry is further configured to: generate at least another reference signal based on the selected harmonic frequency and the received RF signal.

In Example 9, the subject matter of any one or more of Examples 1-8 optionally include wherein: the two or more carrier frequencies comprise a first local oscillator frequency ($fLO1$) and a second local oscillator frequency ($fLO2$); and the one or more harmonic frequencies are determined based on the formula $m*fLO1 \pm n*fLO2$, wherein m and n are integer values.

In Example 10, the subject matter of any one or more of Examples 1-9 optionally include wherein the reference signal generation circuitry comprises at least one multiphase mixer to generate the one or more reference signals.

In Example 11, the subject matter of any one or more of Examples 1-10 optionally include wherein the reference signal generation circuitry comprises compressed sampling circuitry or one or more parallel oscillators to generate the reference signal.

In Example 12, the subject matter of any one or more of Examples 1-11 optionally include wherein the cancellation circuitry is further configured to: adjust one or both of gain and phase of the reference signal prior to removal of the detected blocker signals, the adjustment based on a feedback signal.

In Example 13, the subject matter of any one or more of Examples 1-12 optionally include wherein the two carrier frequencies are aggregated in accordance with a carrier aggregation technique.

Example 14 is a method for cancelling multiple blocker signals, the method comprising: generating a digitized downconverted signal based on a received radio frequency (RF) signal; activating a plurality of filter chains associating with a corresponding plurality of harmonic frequencies of two carrier frequencies; estimating signal power at the plurality of harmonic frequencies to detect a plurality of blocker signals that exceed a pre-determined threshold, each blocker signal associated with a corresponding one of the harmonic frequencies; generating a plurality of pre-processed reference signals based on the plurality of reference signals (e.g., by gain and/or phase adjustment of the reference signals and using a feedback signal); and applying a plurality of pre-processed reference signals to the digitized downconverted signal to remove distortion associated with the corresponding plurality of blocker signals, the pre-processed reference signals based on the reference signals.

In Example 15, the subject matter of Example 14 optionally includes estimating noise level at the plurality of harmonic frequencies; and determining the noise level is above a noise level threshold for a selected harmonic frequency of the plurality of harmonic frequencies.

In Example 16, the subject matter of Example 15 optionally includes generating another reference signal corresponding to the selected harmonic frequency; and applying the another reference signal to the digitized downconverted signal to reduce the estimated noise level.

In Example 17, the subject matter of any one or more of Examples 14-16 optionally include determining the corresponding one of the harmonic frequencies for each of the blocker signals; and generating the plurality of reference signals based at least in part on the determined harmonic frequency for each of the blocker signals.

In Example 18, the subject matter of Example 17 optionally includes wherein the determining comprises: mapping each of the detected blocker signals to the plurality of harmonic frequencies to determine the corresponding one of the harmonic frequencies.

Example 19 is at least one machine-readable medium that, when executed by a machine, causes the machine to perform any of the methods of Examples 14-18.

Example 20 is a device comprising means to perform any of the methods of Examples 14-18.

Example 21 is a computer-readable medium comprising instructions that, when executed on processing circuitry of a user equipment (UE), cause the UE to: receive a radio frequency (RF) signal on one of a plurality of receive paths of the UE; generate a digitized downconverted signal based on the RF signal; detect a blocker signal in the downconverted signal, the blocker signal having power that exceeds a pre-determined threshold; map the detected blocker signal to a plurality of harmonic frequencies associated with two or more carrier frequencies to determine a harmonic frequency associated with the blocker signal; generate a reference signal based on the harmonic frequency associated with the blocker signal and the received RF signal; and apply a pre-processed reference signal to the digitized downconverted signal to remove distortion of the detected blocker signal, the pre-processed reference signal based on adjusting phase and/or gain in the reference signal.

In Example 22, the subject matter of Example 21 optionally includes wherein the instructions further cause the UE to: map the detected blocker signal to a closest one of the plurality of harmonic frequencies to determine the harmonic frequency associated with the blocker signal.

In Example 23, the subject matter of Example 22 optionally includes wherein: the two or more carrier frequencies comprise a first local oscillator frequency (fLO1) and a second local oscillator frequency (fLO2); and the harmonic frequency associated with the blocker signal is determined based on the formula $m*fLO1 \pm n*fLO2$, wherein m and n are integer values. In an example, more than two LO frequencies can be used (e.g., n LO frequencies), and the harmonic frequencies can then be determined based on the formula $k\_1*fLO1 +- \ldots +- k\_n*fLOn$, where $k\_1, \ldots, k\_n$ are integers.

In Example 24, the subject matter of Example 23 optionally includes wherein the instructions further cause the UE to: enable an interference detection path in the received RF signal at the harmonic frequency associated with the blocker signal, to generate the reference signal.

Example 25 is an apparatus of a wireless device, the apparatus comprising: means for generating a digitized downconverted signal based on a received radio frequency (RF) signal; means for activating a plurality of filter chains associating with a corresponding plurality of harmonic frequencies of two carrier frequencies; means for estimating signal power at the plurality of harmonic frequencies to detect a plurality of blocker signals that exceed a pre-determined threshold, each blocker signal associated with a corresponding one of the harmonic frequencies; means for generating a plurality of reference signals associated with the plurality of blocker signals, the generating based at least in part on the received RF signal; and means for applying a plurality of pre-processed reference signals to the digitized downconverted signal to remove distortion associated with the corresponding plurality of blocker signals, the pre-processed reference signals based on the reference signals.

In Example 26, the subject matter of Example 25 optionally includes means for estimating noise level at the plurality of harmonic frequencies; and means for determining the noise level is above a noise level threshold for a selected harmonic frequency of the plurality of harmonic frequencies.

In Example 27, the subject matter of Example 26 optionally includes means for generating another reference signal corresponding to the selected harmonic frequency; and means for applying the another reference signal to the digitized downconverted signal to reduce the estimated noise level.

In Example 28, the subject matter of any one or more of Examples 25-27 optionally include or 27, further comprising: means for determining the corresponding one of the harmonic frequencies for each of the blocker signals; and means for generating the plurality of reference signals based at least in part on the determined harmonic frequency for each of the blocker signals.

In Example 29, the subject matter of Example 28 optionally includes wherein the means for determining comprises: means for mapping each of the detected blocker signals to the plurality of harmonic frequencies to determine the corresponding one of the harmonic frequencies.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document;

for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus of a wireless device, the apparatus comprising:
    baseband processing circuitry configured to generate a digitized downconverted signal based on a received radio frequency (RF) signal;
    estimation circuitry configured to:
        detect a blocker signal in the digitized downconverted signal, the blocker signal having power that exceeds a pre-determined threshold; and
        map the detected blocker signal to a plurality of harmonic frequencies associated with two or more carrier frequencies;
    reference signal generation circuitry configured to generate at least a first reference signal based on the plurality of harmonic frequencies, the received RF signal, and the two or more carrier frequencies; and
    cancellation circuitry configured to remove distortion associated with the blocker signal by applying a pre-processed reference signal to the digitized downconverted signal, the pre-processed reference signal based on the first reference signal.

2. The apparatus according to claim 1, wherein the digitized downconverted signal is a baseband signal or an intermediate frequency (IF) signal.

3. The apparatus according to claim 1, wherein the estimation circuitry comprises a plurality of filtering chains for a corresponding plurality of frequency sub-bands.

4. The apparatus according to claim 3, wherein the estimation circuitry is further configured to:
    engage a portion of the plurality of filtering chains associated with the plurality of harmonic frequencies; and
    detect a power level of the blocker signal using the engaged portion of the plurality of filtering chains.

5. The apparatus according to claim 4, wherein the estimation circuitry is further configured to:
    detect that the blocker signal overlaps with one of the plurality of harmonic frequencies; and
    identify the one of the plurality of harmonic frequencies to the reference signal generation circuitry.

6. The apparatus according to claim 5, wherein the reference signal generation circuitry is further configured to:
    generate the first reference signal based on the identified one of the plurality of harmonic frequencies.

7. The apparatus according to claim 1, wherein the estimation circuitry is further configured to:
    select a harmonic frequency of the plurality of harmonic frequencies, wherein a noise level of the digitized downconverted signal at the selected harmonic frequency exceeds the pre-determined threshold.

8. The apparatus according to claim 7, wherein the reference signal generation circuitry is further configured to:
    generate at least a second reference signal based on the selected harmonic frequency and the received RF signal.

9. The apparatus of claim 1, wherein:
    the two or more carrier frequencies comprise a first local oscillator frequency (fLO1) and a second local oscillator frequency (fLO2); and
    the plurality of harmonic frequencies are determined based on an integer m multiplied by fLO1 plus/minus an integer n multiplied by fLO2.

10. The apparatus of claim 1, wherein the reference signal generation circuitry comprises at least one multiphase mixer to generate the first reference signal.

11. The apparatus of claim 1, wherein the reference signal generation circuitry comprises compressed sampling circuitry or one or more parallel oscillators to generate the first reference signal.

12. The apparatus of claim 1, wherein the cancellation circuitry is further configured to:
    adjust one or both of gain and phase of the first reference signal prior to removal of the detected blocker signal, the adjustment based on a feedback signal.

13. The apparatus of claim 1, wherein the two or more carrier frequencies are aggregated in accordance with a carrier aggregation technique.

14. A method for cancelling multiple blocker signals, the method comprising:
    generating a digitized downconverted signal based on a received radio frequency (RF) signal;
    activating a plurality of filter chains associated with a corresponding plurality of harmonic frequencies of two carrier frequencies;
    estimating signal power at the corresponding plurality of harmonic frequencies to detect a plurality of blocker signals that exceed a pre-determined threshold, each blocker signal associated with a corresponding one of the corresponding plurality of harmonic frequencies;
    generating a plurality of reference signals associated with the plurality of blocker signals, the generating based at least in part on the received RF signal and the two carrier frequencies; and
    removing distortion associated with the plurality of blocker signal by applying a plurality of pre-processed reference signals to the digitized downconverted signal the pre-processed reference signals based on the plurality of reference signals.

15. The method according to claim 14,
    further comprising: estimating a noise level at the corresponding plurality of harmonic frequencies; and
    determining the noise level is above a noise level threshold for a selected harmonic frequency of the corresponding plurality of harmonic frequencies.

16. The method according to claim 15, further comprising:
   generating an additional reference signal corresponding to the selected harmonic frequency, the additional reference signal being separate from the plurality of reference signals; and
   applying an additional pre-processed reference signal corresponding to the additional reference signal to the digitized downconverted signal to reduce the estimated noise level.

17. The method according to claim 14, further comprising:
   determining the corresponding one of the corresponding plurality of harmonic frequencies for each of the plurality of blocker signals; and
   generating the plurality of reference signals associated with the plurality of blocker signals based at least in part on the determined corresponding one of the corresponding plurality of harmonic frequencies.

18. The method according to claim 17, wherein the determining comprises:
   mapping each of the plurality of blocker signals to the corresponding plurality of harmonic frequencies to determine the corresponding one of the corresponding plurality of harmonic frequencies.

19. A non-transitory computer-readable medium comprising instructions that, when executed on processing circuitry of a user equipment (UE), cause the UE to:
   receive a radio frequency (RF) signal on one of a plurality of receive paths of the UE;
   generate a digitized downconverted signal based on the RF signal;
   detect a blocker signal in the downconverted signal, the blocker signal having power that exceeds a pre-determined threshold;
   map the detected blocker signal to a plurality of harmonic frequencies associated with two or more carrier frequencies to determine a harmonic frequency associated with the blocker signal;
   generate a reference signal based on the harmonic frequency associated with the blocker signal, the received RF signal, and the two or more carrier frequencies; and
   remove distortion of the detected blocker signal by applying a pre-processed reference signal to the digitized downconverted signal, the pre-processed reference signal based on adjusting phase and/or gain in the reference signal.

20. The non-transitory computer-readable medium of claim 19, wherein the instructions further cause the UE to:
   map the detected blocker signal to a closest one of the plurality of harmonic frequencies to determine the harmonic frequency associated with the blocker signal.

21. The non-transitory computer-readable medium of claim 20, wherein:
   the two or more carrier frequencies comprise a first local oscillator frequency (fLO1) and a second local oscillator frequency (fLO2); and
   the harmonic frequency associated with the blocker signal is determined based on an integer m multiplied by fLO1 plus/minus an integer n multiplied by fLO2.

22. The non-transitory computer-readable medium of claim 21, wherein the instructions further cause the UE to:
   enable an interference detection path in the received RF signal at the harmonic frequency associated with the blocker signal, to generate the reference signal.

* * * * *